United States Patent [19]

Bartos

[11] Patent Number: 5,590,620
[45] Date of Patent: Jan. 7, 1997

[54] TIRE AIR PRESSURE WARNING DEVICE FOR WHEELED VEHICLES

[75] Inventor: Josef A. Bartos, Diamond Bar, Calif.

[73] Assignee: Tire Inflation Systems Corp., Willoughby, Ohio

[21] Appl. No.: 375,582

[22] Filed: Jan. 19, 1995

[51] Int. Cl.$^6$ .................................................. B60C 23/02
[52] U.S. Cl. .......................... 116/34 R; 73/146.3; 137/227
[58] Field of Search .......................... 116/34 R, 34 A, 116/34 B, 269, 271; 73/146.2, 146.3, 146.4, 146.8; 137/111, 227

[56] References Cited

U.S. PATENT DOCUMENTS

| | | |
|---|---|---|
| 2,362,883 | 11/1944 | Cecil . |
| 2,463,335 | 3/1949 | Warnshuis et al. . |
| 3,129,690 | 4/1964 | Nygard . |
| 3,235,684 | 2/1966 | Jordan et al. ........................ 116/34 R |
| 3,260,233 | 7/1966 | Bergunder ............................ 116/34 R |
| 3,527,189 | 11/1967 | Perry . |
| 3,958,526 | 5/1976 | Liquie . |
| 4,131,876 | 12/1978 | Dees, Sr. et al. ...................... 116/34 R |
| 4,468,650 | 8/1984 | Barbee .................................. 116/34 R |
| 4,476,803 | 10/1984 | Malec ................................... 116/34 R |
| 4,646,673 | 3/1987 | Fordyce . |

Primary Examiner—William A. Cuchlinski, Jr.
Assistant Examiner—Andrew Hirshfeld
Attorney, Agent, or Firm—Vickers, Daniels & Young

[57] ABSTRACT

A tire air pressure warning device for dual tires mounted on a common hub of a vehicle comprises a housing mounted on a hub component and having first and second pressure sensors connected in flow communication with a corresponding one of the vehicle tires. A first indicator is pivotally mounted on the housing for displacement between stored and actuated positions, and a second indicator is mounted on the first indicator for displacement therewith and for pivotal displacement relative thereto in response to displacement of the first indicator from the stored to the actuated position thereof. The first indicator is released for displacement from the stored to the actuated position thereof in response to either one of the pressure sensors sensing an unacceptable pressure in the corresponding vehicle tire, and the second indicator is displaced relative to the first indicator during the displacement of the latter to its actuated position to visually indicate which one of the two tires has the unacceptable pressure condition.

46 Claims, 8 Drawing Sheets

TIRE AIR PRESSURE WARNING DEVICE FOR WHEELED VEHICLES

BACKGROUND OF THE INVENTION

This invention relates to the art of tire pressure indicators and, more particularly to an improved warning device for indicating an unacceptable air pressure condition in either one of dual tires mounted on a common end of a vehicle axle.

Numerous devices have been devised heretofore for providing dual wheel assemblies on trucks, trailers, recreational vehicles and the like with a device or devices for indicating an undesirable tire pressure in one of the tires of the wheel assembly. In this respect, for example, U.S. Pat. Nos. 2,362,883 to Cecil and 2,463,335 to Warnshuis et al disclose dual tires connected in air flow communication with a common pressure sensor which, in response to an undesirably low air pressure condition in the tires, is operable to produce an audible or visual signal to indicate such condition. A major disadvantage of these mechanisms is that they operate to maintain an air pressure balance between the two tires whereby, when the undesirable low pressure is reached to actuate the alarm the vehicle operator has no way of determining whether one or the other or both of the tires is causing the pressure loss.

As another example, U.S. Pat. Nos. 3,527,189 to Perry and 4,646,673 to Fordice disclose low tire pressure indicating mechanisms comprising a discretely mounted pressure responsive device for each tire. Either a single indicator is released by one of the pressure responsive devices when the corresponding tire pressure is lower than desired, or a pair of indicators each associated with a corresponding one of the pressure responsive devices is released thereby when the corresponding tire pressure is unacceptably low. While these arrangements isolate the dual tires with respect to indicating a low pressure condition in either tire and, additionally, indicating to the vehicle operator which one of the two tires has the undesirably low pressure, they are structurally complex and expensive with respect to having to provide at least a pressure responsive device for each of the two tires and in most instances, a corresponding indicator for each of the pressure responsive devices.

As yet another example, U.S. Pat. Nos. 3,129,690 to Nygard and 3,958,526 to Liquie disclose low tire pressure indicating mechanisms including pressure responsive arrangements for releasing a single indicator in response to a low air pressure condition in one or the other tires of a dual wheel assembly. In Nygard, a tire air pressure balanced diaphragm responds to a low pressure condition in either one of the tires to release the indicator, and in Liquie each tire is provided with a corresponding pressure responsive device by which an inflatable indicator is displaced relative to the wheel assembly in response to a low pressure condition in either tire. Neither of these devices is operable to indicate which of the two tires has the low pressure condition, and the Nygard device is inoperable in a situation where both tires have the same air pressure even if such pressure is below a desired pressure.

SUMMARY OF THE INVENTION

In accordance with the present invention, an improved tire pressure warning device for the two tires of a dual wheel assembly is provided which overcomes the foregoing and other disadvantages of such indicators or warning devices heretofore available while maintaining the desired capability of visually indicating which one of the two tires has the unacceptable air pressure condition. More particularly in this respect, an indicator according to the present invention is structurally simple and compact, thus minimizing the size thereof and the space occupied thereby when mounted on the outer end of the dual wheel assembly. Moreover, the warning device is more economical to produce and easier to install than such devices heretofore available, is efficient in operation and easy to reengage following actuation while, advantageously requiring the unacceptable pressure condition to have been corrected before reenagement can be achieved.

A tire air pressure warning device providing the foregoing attributes in accordance with the present invention comprises a housing mountable on the axially outer end of a dual wheel assembly and having a first indicator mounted on the housing and displaceable relative thereto between stored and actuated positions. In the actuated position, the first indicator is visible to a vehicle operator such as through the rear view mirror of the vehicle, and the first indicator is displacable from the stored to the actuated position in response to the existence of an unacceptable air pressure of either one of the two tires of the dual wheel assembly. More particularly in this respect, a pressure sensor is provided in the housing for each of the two tires and is connected in flow communication with air in the corresponding tire. Each sensor is responsive to a predetermined unacceptable air pressure in the corresponding tire to cause release of a latch mechanism by which the first actuator is held in the stored position thereof. Further, in accordance with the invention, a second indicator is actuated in response to displacement of the first indicator to its actuated position, and the second indicator when actuated indicates which one of the two tires has the unacceptable pressure condition. Thus, the vehicle operator can quickly determine which tire has the unacceptable pressure condition and take the necessary steps to correct the condition.

Preferably, the second indicator is mounted on the first indicator for displacement therewith from the stored to the actuated position thereof and for displacement relative thereto between first and second positions in which the second indicator respectively indicates the unacceptable pressure condition to be in a first and second one of the two tires. In accordance with one aspect of the invention, the second indicator is interengagable with keepers actuated by the pressure sensing devices so as to latch the first indicator in its stored position. In response to actuation of either one of the keepers in response to an unacceptable pressure condition in the corresponding tire, the first indicator is released for displacement from the stored to the actuated position thereof. During such displacement of the first indicator, the second indicator interengages with the other keeper and is displaced relative to the first indicator to the indicating position thereof which indicates the tire having the unacceptable tire pressure.

In accordance with a preferred embodiment, the second indicator is pivotally mounted on the first indicator and is engaged in the stored position of the indicator by keeper rods, and the pressure sensing devices include pistons displaceable in corresponding chambers communicating with air under pressure in a corresponding one of the two tires. The keeper rods are attached to the pistons for displacement therewith, whereby displacement of either one of the keeper rods from engagement with the second indicator frees the second indicator for pivotal displacement relative to the first indicator. This releases the first indicator for displacement relative to the housing to the actuated position thereof and, during such displacement of the first indicator, interengagement between the second indicator and the other of the keeper rods causes the second indicator to pivot relative to the first indicator to the corresponding one its indicating positions. The keeper position relative to the second indicator is determined by the pressure of air in the corresponding tire. Accordingly, until the unacceptable condition is corrected so as to displace the keeper into position for interengagement with the second indicator to latch the first indicator in its stored position, the latter cannot take place. In this respect, both keepers must interengage with the second indicator to preclude displacement thereof relative to the first indicator in response to movement of the latter from the stored to the actuated position thereof.

It is accordingly an outstanding object of the present invention to provide an improved warning device for indicating an unacceptable air pressure condition in either one of the two tires of a vehicle dual wheel assembly.

Another object is the provision of a warning device of the foregoing character which has a first indicator for indicating an unacceptable air pressure in one of the two tires and a second indicator for indicating the one of the two tires which has the unacceptable air pressure condition.

A further object is the provision of a warning device of the foregoing character in which the first indicator is displaced to an actuated position in response to an unacceptable pressure condition in either one of the two tires and wherein the second indicator is displaced to one of two indicator positions during displacement of the first indicator to its actuated position such that the second indicator indicates which of the two tires has the unacceptable pressure condition.

Still another object is the provision of a warning device of the foregoing character wherein the second indicator is mounted on the first indicator for displacement therewith and for displacement relative thereto and is cooperable with keepers associated with corresponding tire pressure sensing devices to latch the first indicator in its stored position and to release the first indicator for displacement to its actuated position.

Still another object is the provision of a warning device of the foregoing character wherein the first indicator cannot be latched in its stored position following actuation until the undesirable tire air pressure condition is corrected and wherein, following such correction, the second indicator and keepers are cooperable to provide for the first indicator to be readily returned to its stored position through a latching interengagement therebetween.

Still a further object is the provision of a warning device of the foregoing character which is structurally simple and compact, readily mountable on a vehicle hub and which, when mounted, occupies minimal space relative to the dual wheel assembly, and which warning device is economic to construct and efficient in operation.

BRIEF DESCRIPTION OF THE DRAWING

The foregoing objects, and others, will in part be obvious and in part pointed out more fully hereinafter in conjunction with the written description of preferred embodiments of the invention illustrated in the accompanying drawing in which.

DESCRIPTION OF A PREFERRED EMBODIMENT

Figure 1:
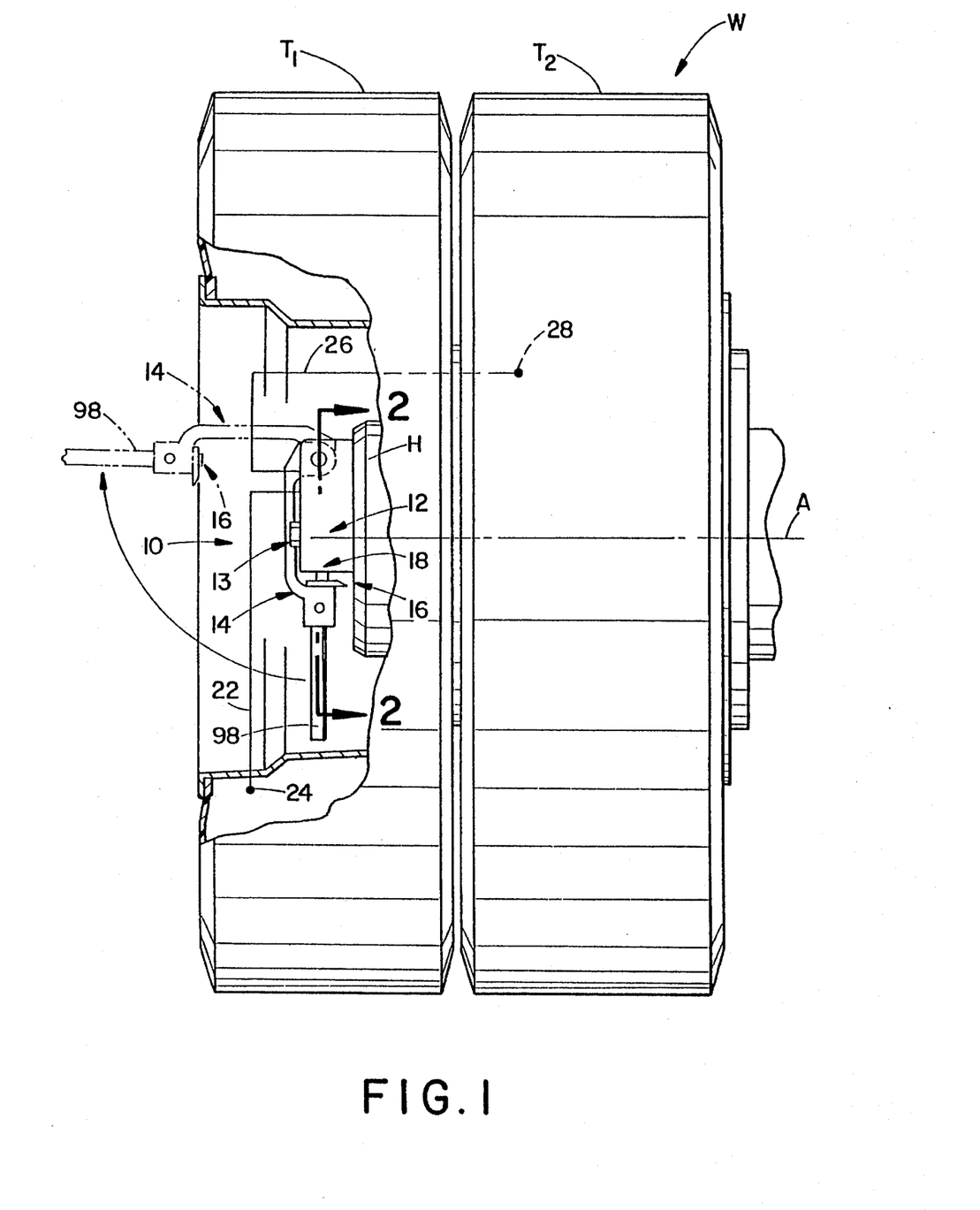
FIG. 1 is an elevation view somewhat schematically illustrating a warning device in accordance with the present invention mounted on the outer end of a hub component of a dual wheel assembly.

Referring now in greater detail to the drawings, wherein the showings are for the purpose of illustrating preferred embodiments of the invention only and not for the purpose of limiting the invention, a low tire pressure warning device 10 in accordance with the present invention is illustrated in FIG. 1 as being mounted on the axially outer end of the common hub H of a dual wheel assembly W comprised of tires T1 and T2 which are mounted on the hub for rotation therewith about a wheel axis A. As described in greater detail hereinafter, warning device 10 comprises a housing 12 attached to hub H by bolts 13 and a first indicator 14 pivotally mounted on housing 12 for displacement between stored and actuated positions relative to the housing as respectively shown in FIG. 1 by solid and broken lines. The warning device further includes a second indicator 16 mounted on first indicator 14 for displacement therewith and, as will become apparent hereinafter, for displacement relative thereto. Second indicator 16 is cooperable with a pair of keeper rods 18 and 20, only rod 18 of which is visible in FIG. 1, to releasably latch first indicator 14 in its stored position. Each of the keeper rods 18 and 20 is associated with a corresponding pressure sensing arrangement in housing 12 and, as schematically shown in FIG. 1, one of the pressure sensing arrangements is connected in flow communication with air under pressure in tire T1 through a line 22 connected to the standard valve stem 24 of tire T1, and the other pressure sensing arrangement is connected with air under pressure in tire T2 through line 26 connected to standard tire valve stem 28 of tire T2. As will also be explained in further detail hereinafter, an unacceptable air pressure condition in either one of the tires T1 and T2 results in the corresponding one of the rods 18 and 20 being displaced from engagement with second indicator 16. This releases first indicator 14 for displacement to the actuated position thereof and, during the initial part of such displacement, second indicator 16 is displaced relative to first indicator 14 to a position indicating the one of the tires T1 and T2 which has the unacceptable air pressure condition.

Referring now to FIGS. 2–5, housing 12 in the orientation of the warning device shown in the drawings has upper and lower ends 12a and 12b, respectively, and laterally outwardly extending portions 30 and 32 intermediate the upper and lower ends. Portions 30 and 32 are provided with corresponding openings 34 therethrough for bolts 13 by which the warning device is mounted on the axially outer end of hub H. Housing 12 is bored from lower end 12b thereof towards the upper end to provide a pair of parallel laterally adjacent chambers 36 and 38 having corresponding axes 37 and 39. Chambers 36 and 38 are closed at the lower ends thereof by a corresponding retainer collar 40 through which the lower ends of the corresponding one of rods 18 and 20 extend. Each of the collars 40 is provided with a circumferentially extending arcuant recess 42, and a retaining pin 44 extends through a bore therefor in housing 12 and interengages with the diametrically opposed inner portions of recesses 42 to retain collars 40 in place at the lower end of bores 36 and 38. An O-ring seal 46 sealingly engages between collar 40 and the corresponding one of the rods 18 and 20. Piston rods 18 and 20 are coaxial with axis 37 and 39, respectively, and the upper ends of rods 18 and 20 are attached to piston members 48 and 50, respectively. Each piston has a corresponding O-ring seal 51, and a compression spring 52 surrounds each of the rods 18 and 20 between the corresponding piston member and collar 40 to bias the piston member and thus the corresponding rod upwardly in the corresponding one of the chambers 36 and 38.

Figure 2:
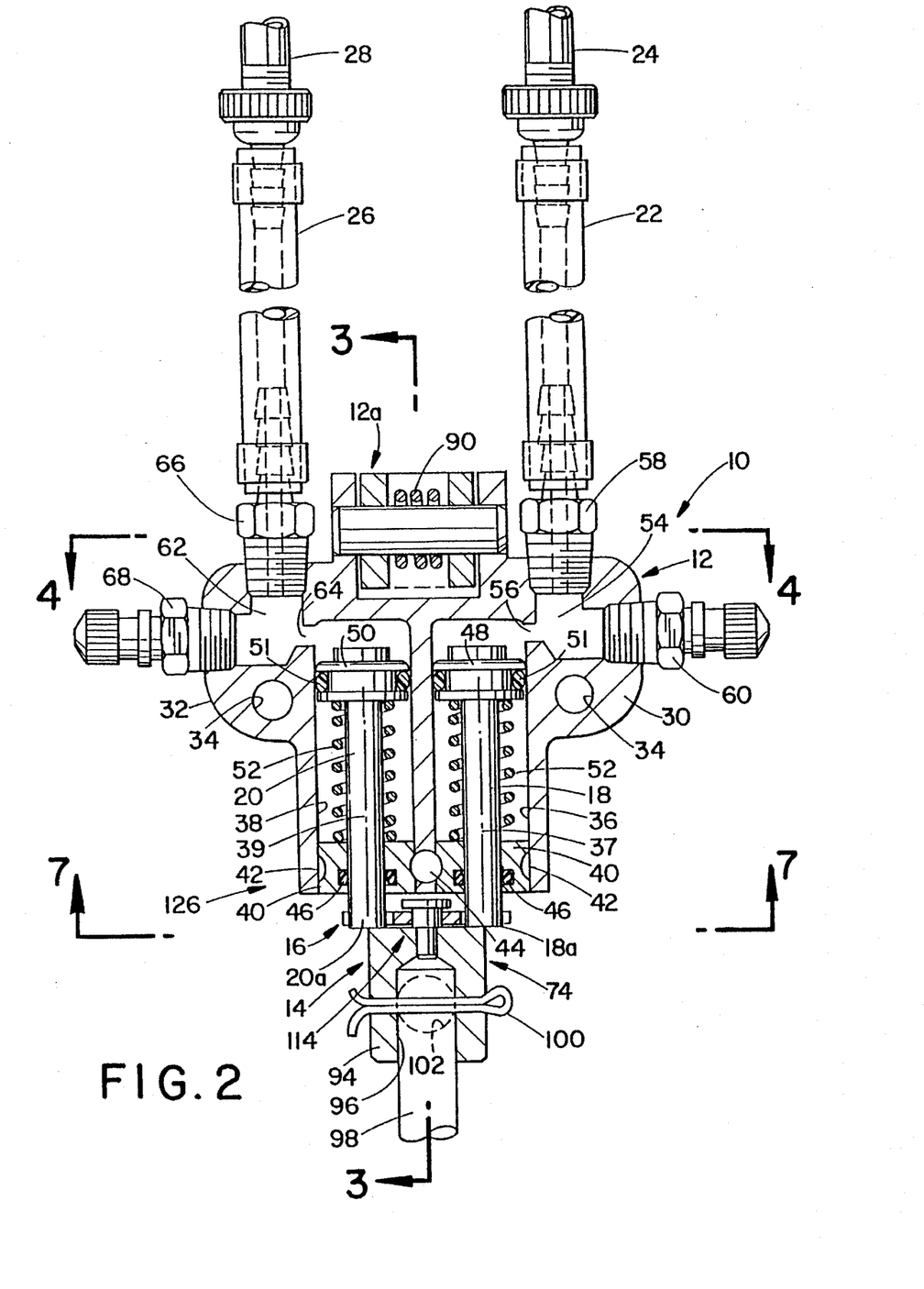
FIG. 2 is a sectional elevation view of the warning device taken along line 2—2 in FIG. 1.
Figure 3:
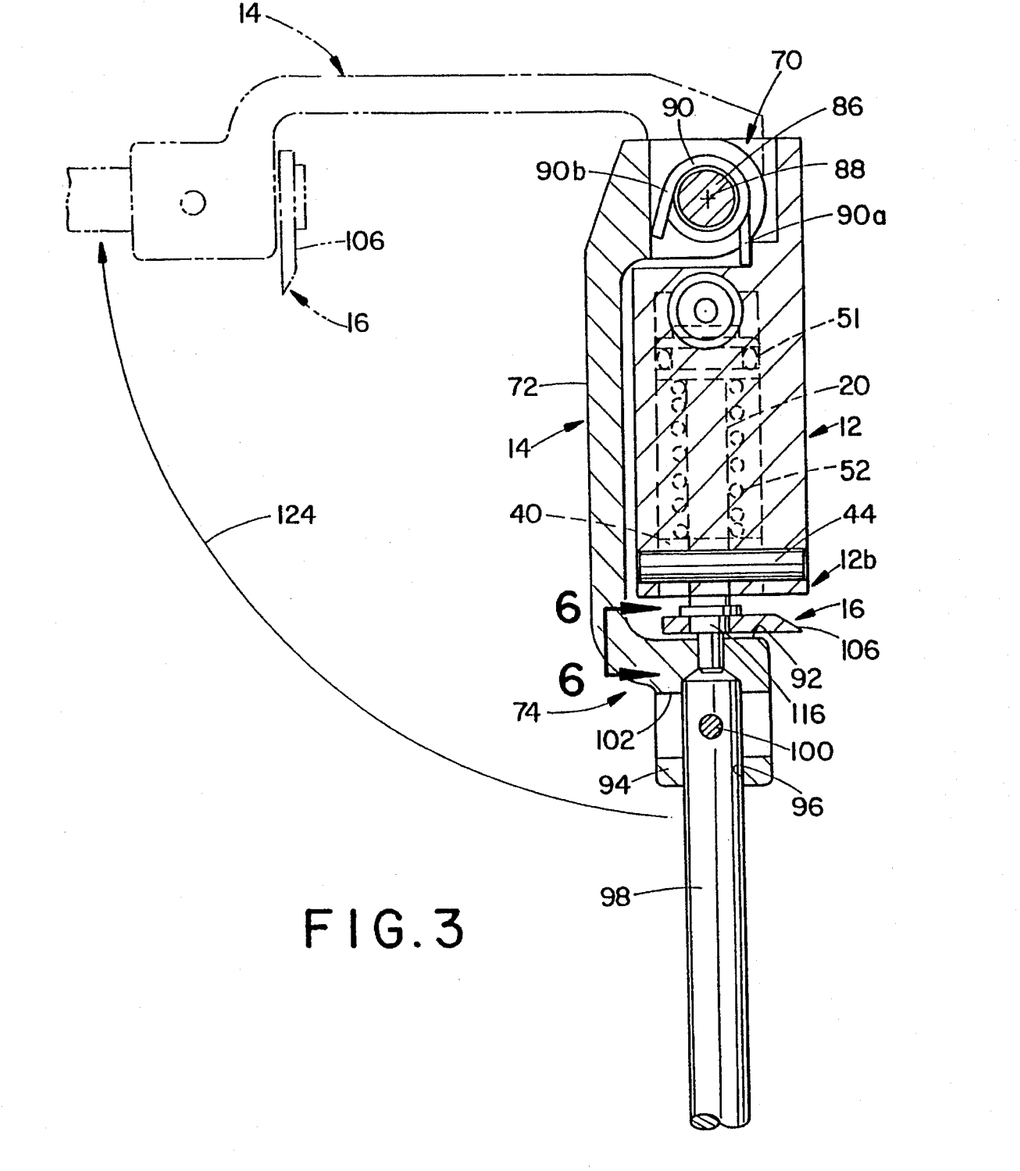
FIG. 3 is a sectional elevation view of the warning device taken along line 3—3 in FIG. 2.
Figure 4:
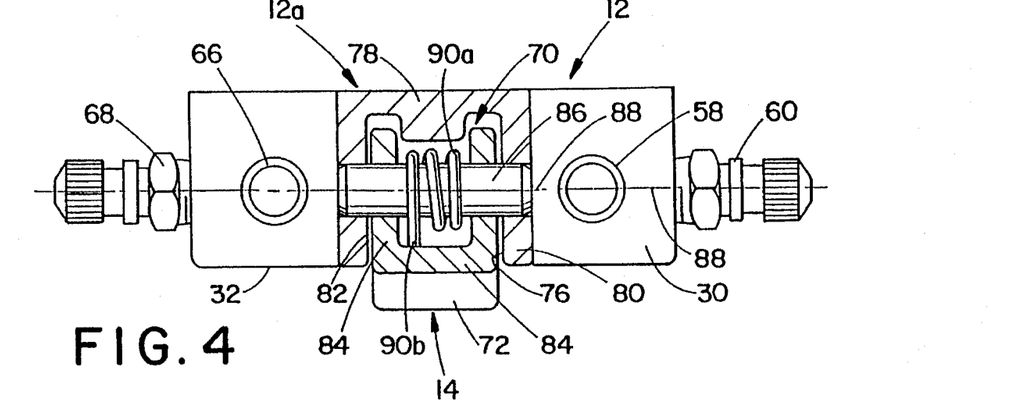
FIG. 4 is a plan view of the warning device, partially in section, taken along line 4—4 in FIG. 2.

The upper end of chamber 36 is adapted to be connected in flow communication with air under pressure in tire T1 and, for this purpose, the upper end of housing 12 is provided with an inlet chamber 54 communicating with chamber 36 above piston 48 through an inlet port 56. Housing 12 is provided with a fitting 58 opening into chamber 54 and connected to tire T1 through line 22 and tire valve stem 24. A standard tire inflating-deflating valve is provided in a fitting 60 opening into chamber 54 and provides for tire T1 to be inflated and/or deflated through the warning device. Similarly, the upper end of chamber 38 is connected in flow communication with air under pressure in tire T2 by means of an inlet chamber 62 and inlet port 64, and a coupling 66 connects chamber 62 with tire T2 through line 26 and tire valve stem 28. Again, as with inlet chamber 54, housing 12 is provided with a tire inflating-deflating valve fitting 68. As will be appreciated from FIG. 2, the inflate-deflate fittings and tire line couplings 58 and 66 can be reversed As best seen in FIG. 3, first indicator 14 is generally C-shaped and, in its stored position, has an upper end 70 extending inwardly of upper end 12a of housing 12, a leg 72 extending downwardly across the outer side of housing 12, and a lower end 74 extending inwardly beneath lower end 12b of housing 12 and carrying second indicator 16. As best seen in FIGS. 2 and 4 upper end 12a of housing 12 is provided with a forwardly open recess 76 having a back wall 78 and laterally spaced apart sidewalls 80 and 82, and upper end 70 of first indicator 14 is received in recess 76 and is provided with a pair of laterally spaced apart fingers 84 each laterally inwardly adjacent one of the sidewalls 80 and 82 of the recess. Walls 80 and 82 and fingers 84 are provided with aligned openings therethrough which receive a pivot pin 86 by which first indicator 14 is supported on body portion 12 for movement for pivotal movement in opposite directions about an axis 88 transverse to chamber axes 37 and 39. A torsion spring 90 surrounds pin 86 and has one of its opposite ends 90a engaging against housing 12 and the other end 90b engaging against first indicator 14 such that the first indicator is biased to pivot clockwise in FIG. 3 about axis 88 from the stored to the actuated position thereof respectively shown by solid and broken lines in FIG. 3.

As best seen in FIGS. 2 and 3 of the drawing, lower end 74 of first indicator 14 includes an upper surface 92 axially spaced below lower end 12b of housing 12 and a downwardly extending projection 94 provided with a vertical bore 96. Bore 96 receives an indicator rod 98 which is removably retained in the bore such as by a cotter pin 100. In the preferred embodiment, projection 94 is provided with a second bore 102 transverse to bore 96 and for the purpose set forth hereinafter. While it is preferred to provide for indicator rod 98 to be removably secured to projection 94 of the first indicator, it will be appreciated that the indicator rod could be defined by an integral extension of projection 94. In either event, the indicator rod extends from projection 94 a distance sufficient to assure that the first indicator will be visible to the vehicle operator through the rear view mirror of the vehicle.

Figure 5:
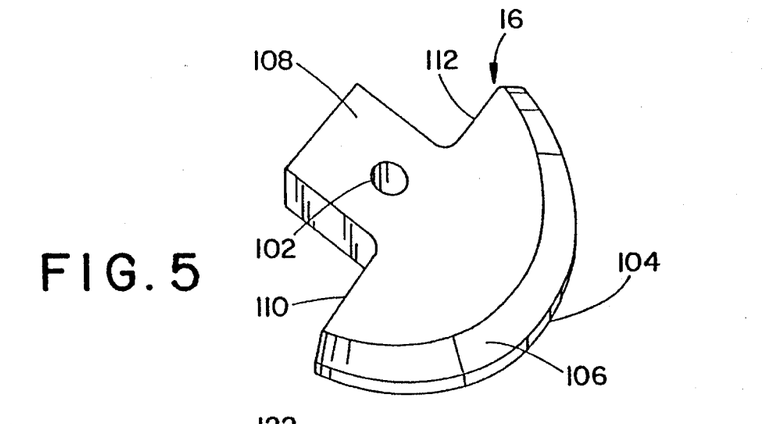
FIG. 5 is a perspective view of the second indicator.
Figure 6:
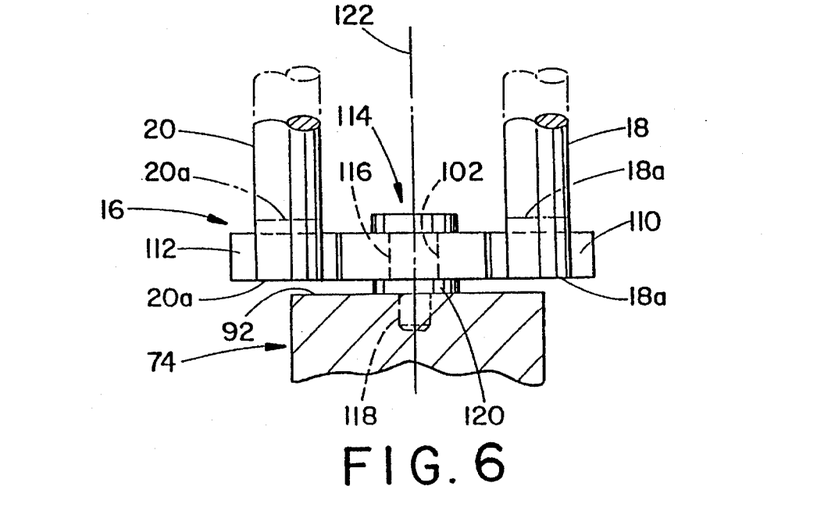
FIG. 6 is an elevation view, partially in section, looking in the direction of lines 6—6 in FIG. 3 and showing the positional relationships between the second indicator and keeper rods.

Second indicator 16, as best seen in FIGS. 5 and 6, is a generally flat plate member having an opening 102 therethrough, a substantially semi-circular outer edge portion 104 which includes a beveled ramp portion 106, a mounting finger 108 and abutment edges 110 and 112 extending radially outwardly from opposite sides of finger 108 and intersecting the corresponding end of edge 104 and ramp 106. Second indicator 16 is mounted in overlying relationship with respect to surface 92 of lower end 74 of first indicator 14 by means of a pivot pin 114 having a shank portion 116 extending through opening 102 in second indicator 16 and into an opening 118 provided therefor in lower end 74 of first indicator 14. Preferably, a washer 120 is interposed between top surface 92 and the underside of second indicator 16. Pin 114 supports second indicator 16 for pivotal displacement relative to lower end 74 of the first indicator in opposite directions about pin axis 122 which is parallel to rod axes 37 and 39 and transverse to pivot axis 88 between housing 12 and first indicator 14.

Figure 7:
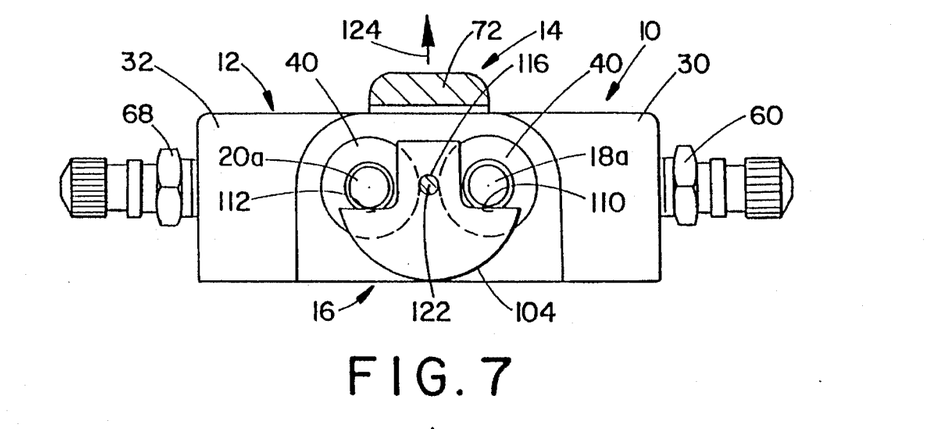
FIG. 7 is a bottom view, partially in section, taken along 7—7 in FIG. 2 and showing the positional relationships between the second indicator and keeper rods in the stored position of the first indicator.
Figure 8:
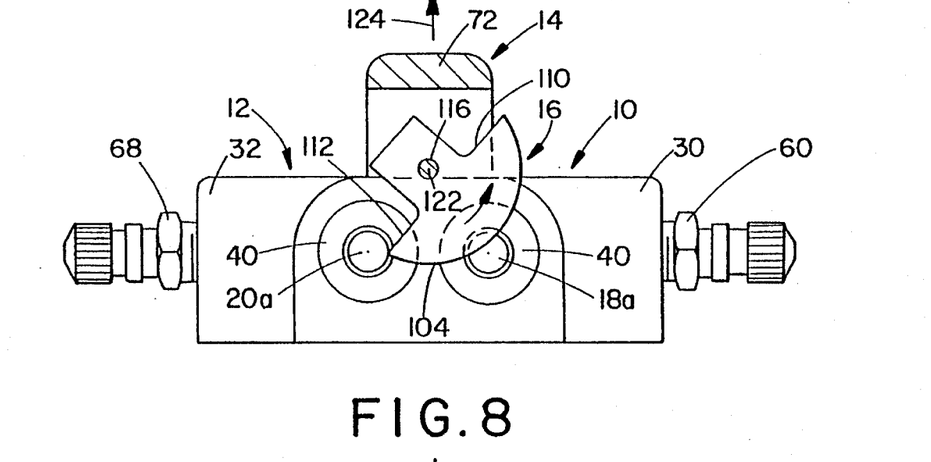
FIG. 8 is a bottom view similar to FIG. 7 and showing the positional relationships between the second indicator and keeper rods during displacement of the first indicator to its actuated position in response to an unacceptable air pressure condition in one of the tires.

As best seen in FIGS. 2, 6 and 7 when first indicator 14 is in its stored position, and the air pressure in each of the tires T1 and T2 is above a predetermined unacceptable low pressure, the tire air pressure in the upper ends of chambers 36 and 38 biases pistons 48 and 50 and thus rods 18 and 20 downwardly, whereby lower ends 18a and 20a of the rods respectively interengage with edges 110 and 112 of second indicator 16 to retain first indicator 14 in the stored position thereof. It will be appreciated that the downward displacement of pistons 48 and 50 and thus rods 18 and 20 is against the bias of the corresponding one of the springs 52, and it will likewise be appreciated that the biasing force exerted by springs 52 is chosen in accordance with the low air tire pressure condition with respect to which the warning device is adapted to be actuated. In this respect, for example, if the warning device is actuated when the air pressure in either one of the tires T1 and T2 decreases to 90 psi, springs 52 are chosen so that upward displacement of the pistons and corresponding rods from the latched positions of lower ends 18a and 20a shown in FIGS. 2, 6 and 7 to the unlatched broken line positions shown in FIG. 6 will not take place until the predetermined 90psi tire pressure is reached.

Operation of warning device 10 will be understood from the foregoing description taken together with the following description with reference to FIGS. 2, 3 and 6–9 of the drawing. In operation, presuming the air pressure in tires T1 and T2 to initially be above the predetermined unacceptable low pressure, rods 18 and 20 are in the lower most positions thereof shown in FIGS. 3 and 6 in which lower ends 18a and 20a thereof are adjacent upper side 92 of lower portion 74 of first indicator 14. In these positions of rods 18 and 20, the lower ends thereof respectively engage edges 110 and 112 of second indicator 16, as shown in FIGS. 6 and 7 to latch first indicator 14 in the stored position thereof shown by solid lines in FIG. 3 of the drawing. Rod ends 18a and 20a interengage with edges 110 and 112 to retain first indicator 14 latched in the stored position thereof against the bias of torsion spring 90 which biases first indicator 14 to pivot about axis 88 of pin 86 in the direction of arrow 124 in FIG. 7. The component parts of the warning device remain in the latched position until such time as the air pressure in one of the tires T1 and T2 decreases below the predetermined acceptable level. Presuming first that the air pressure in tire T1 decreases below the predetermined acceptable pressure, it will be appreciated from FIG. 2 and the foregoing description that the air pressure in the upper end of chamber 36 decreases whereby spring 52 biases piston 48 and thus rod 18 upwardly for the lower end 18a of rod 18 to disengage edge 110 of second indicator 16 as shown by the broken line position of end 18a in FIG. 6. Lower end 20a of rod 20 remains in the solid line position thereof shown in FIG. 6. Since second indicator 16 is pivotal relative to first indicator 14 about axis 122 of pivot pin 114, disengagement of rod end 18a from edge 110 of the second indicator releases first indicator 14 for displacement in the direction of arrow 124 in FIG. 8 under the bias of torsion spring 90. During initial displacement of first indicator 14 in the direction of arrow 124, edge 112 of the second indicator and the lower end 20a of rod 20 cooperatively interengage to pivot second indicator 16 counterclockwise about axis 122 to the position of second indicator 16 shown in FIG. 8 and which position indicates that tire T1 is the tire having the undesirably low pressure condition.

Figure 9:
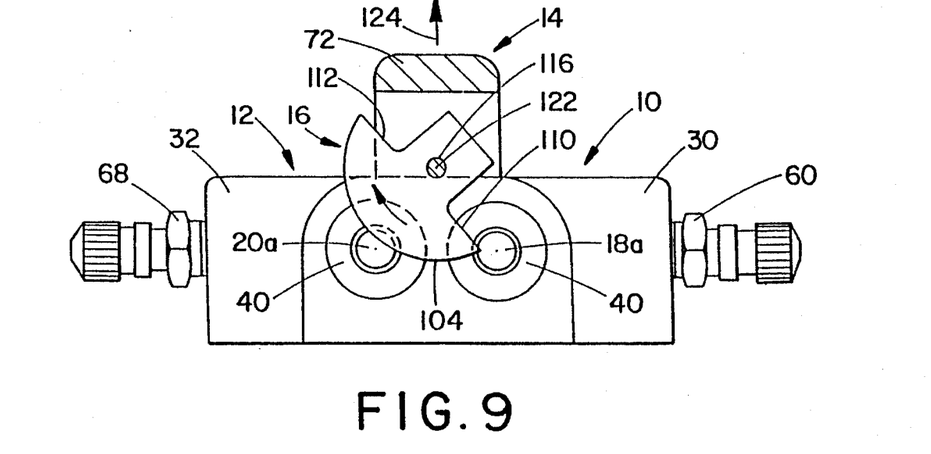
FIG. 9 is a bottom view similar to FIG. 8 and illustrating the component parts in the relative positions thereof when the unacceptable air pressure condition is in the other of the two tires.

Alternatively, presuming the pressure in tire T2 to decrease below the predetermined acceptable low pressure, the corresponding low pressure in the upper end of chamber 38 results in spring 52 biasing piston 50 and thus rod 20 upwardly in chamber 38 whereby lower end 20a of rod 20 moves to the broken line position thereof shown in FIG. 6 and disengages edge 112 of second indicator 16. The lower end 18a of rod 18 remains in the solid line position thereof shown in FIG. 6. As shown in FIG. 9, the disengagement of lower end 20a of rod 20 from edge 112 releases first indicator 14, for displacement relative to housing 12 in the direction of arrow 124 under the bias of torsion spring 90 and, during such initial displacement of first indicator 14 edge 110 of second indicator 16 and the lower end 18a of rod 18 interengage to pivot second indicator 16 clockwise about axis 122 to a position relative to first indicator 14 which indicates that tire T2 is the tire having the unacceptably low pressure condition. Thus, it will be seen from FIGS. 8 and 9 of the drawing that second indicator 16 has two indicator positions relative to first indicator 14 and each of which two positions provides a visual indication with respect to the one of the two tires which has an unacceptably low air pressure condition. Accordingly, when the warning device is actuated as described above, first indicator 14 becomes visible to the driver of the vehicle such as through the rear view mirror of the vehicle, whereby the driver is apprised that the air pressure in one of the tires is unacceptably low. Then, upon visually examining the actuated first indicator 14, the vehicle operator can determine which of the two tires has the low pressure condition by observing the condition of second indicator 16 relative to first indicator 14.

Advantageously, first indicator 14 can not be returned and latched in its stored position until the unacceptably low tire pressure condition is corrected. In this respect, as will be appreciated from the foregoing description, the one of the keeper pin ends 18a and 20a which is displaced to disengage second indicator 16 in response to a low air pressure condition in the corresponding one of the tires T1 and T2 will remain in the broken line position thereof shown in FIG. 6 until such time as the corresponding tire is inflated to raise the pressure therein to an acceptable pressure. The latter will displace the corresponding piston and keeper rod downwardly in FIG. 6 to reposition the lower end of the keeper rod in the solid position in the latter Figure. Until such repositioning of the keeper pin takes place, it will be appreciated that the pivotal relationship between second indicator 16 and first indicator 14 precludes the second indicator interengaging with the keeper pins to latch first indicator 14 in the stored position thereof shown in FIG. 7. When the low pressure condition has been corrected and the lower ends of both keeper rods are in the solid line positions thereof shown in FIG. 6, first indicator 14 is easily returned to the stored position thereof from the actuated position shown in FIG. 3 by broken lines. In this respect, second indicator 16 is pivoted relative to first indicator 14 to the third or latching position thereof centrally between the two indicator positions, and the first indicator is then pivoted counter clockwise from the actuated position thereof shown by broken lines in FIG. 3 to the stored position shown by solid lines. As the first indicator approaches the stored position, beveled edge 106 of the second indicator engages the outer edges of lower ends 18a and 20a of keeper rods 18 and 20 so as to cam the keeper rods upwardly relative to housing 12, whereby the upper side of second indicator 16 slides under lower ends 18a and 20a of the keeper rods. When edges 110 and 112 of the second indicator pass the inner most ends of the keeper rods, the latter move downwardly to the solid line positions shown in FIG. 6, whereby the first indicator is latched in its stored position.

Figure 10:
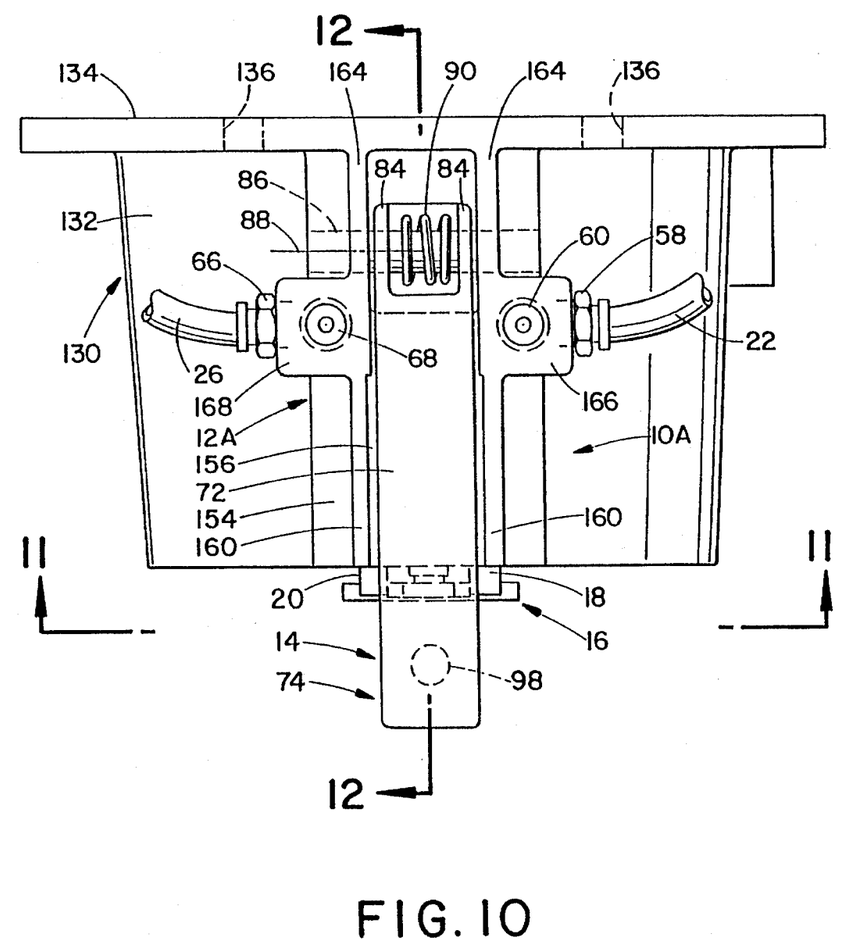
FIG. 10 is a plan view of another embodiment of a warning device in accordance with the present invention.
Figure 11:
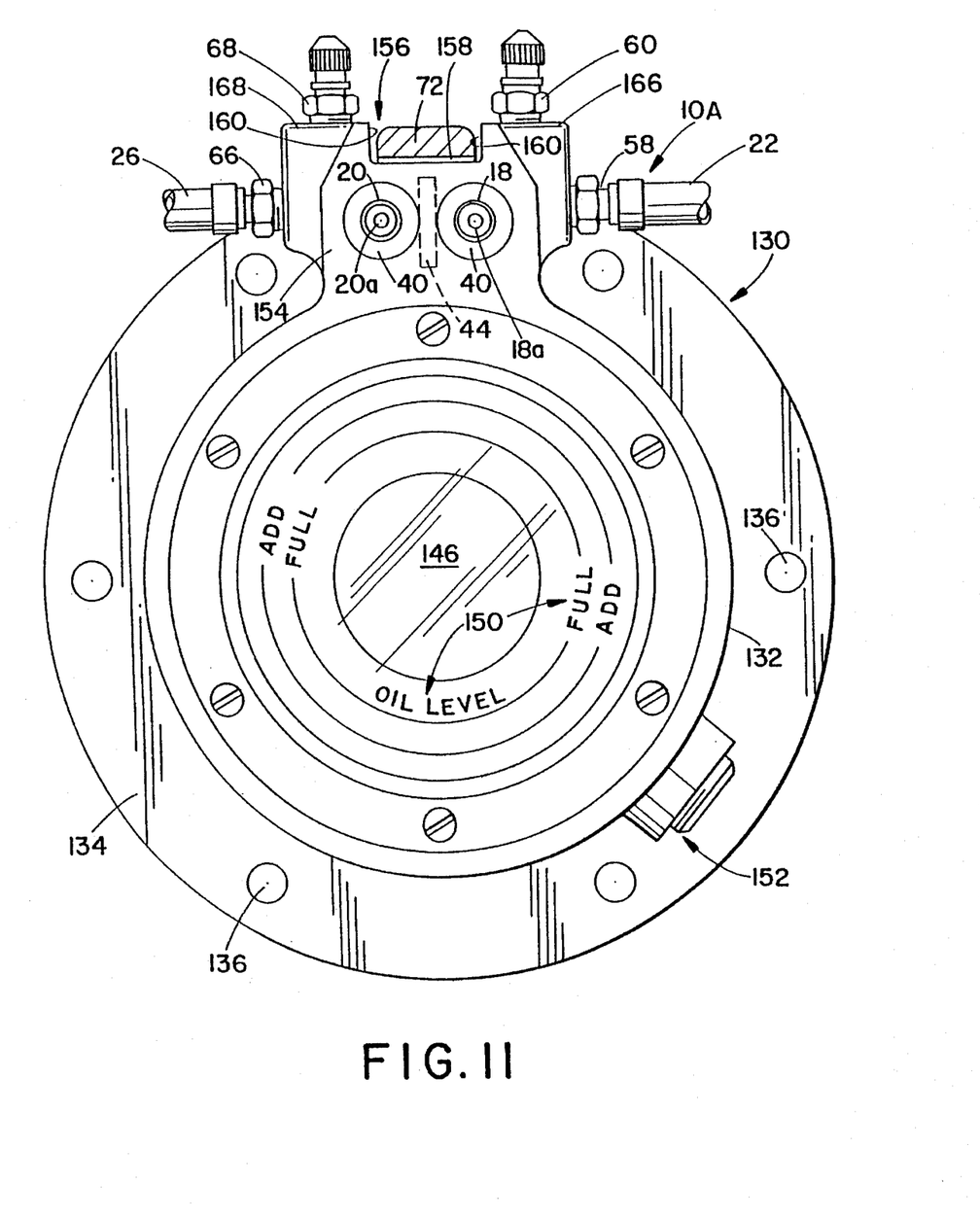
FIG. 11 is an elevation view of the warning device, partially in section, taken along line 11—11 in FIG. 10.
Figure 12:
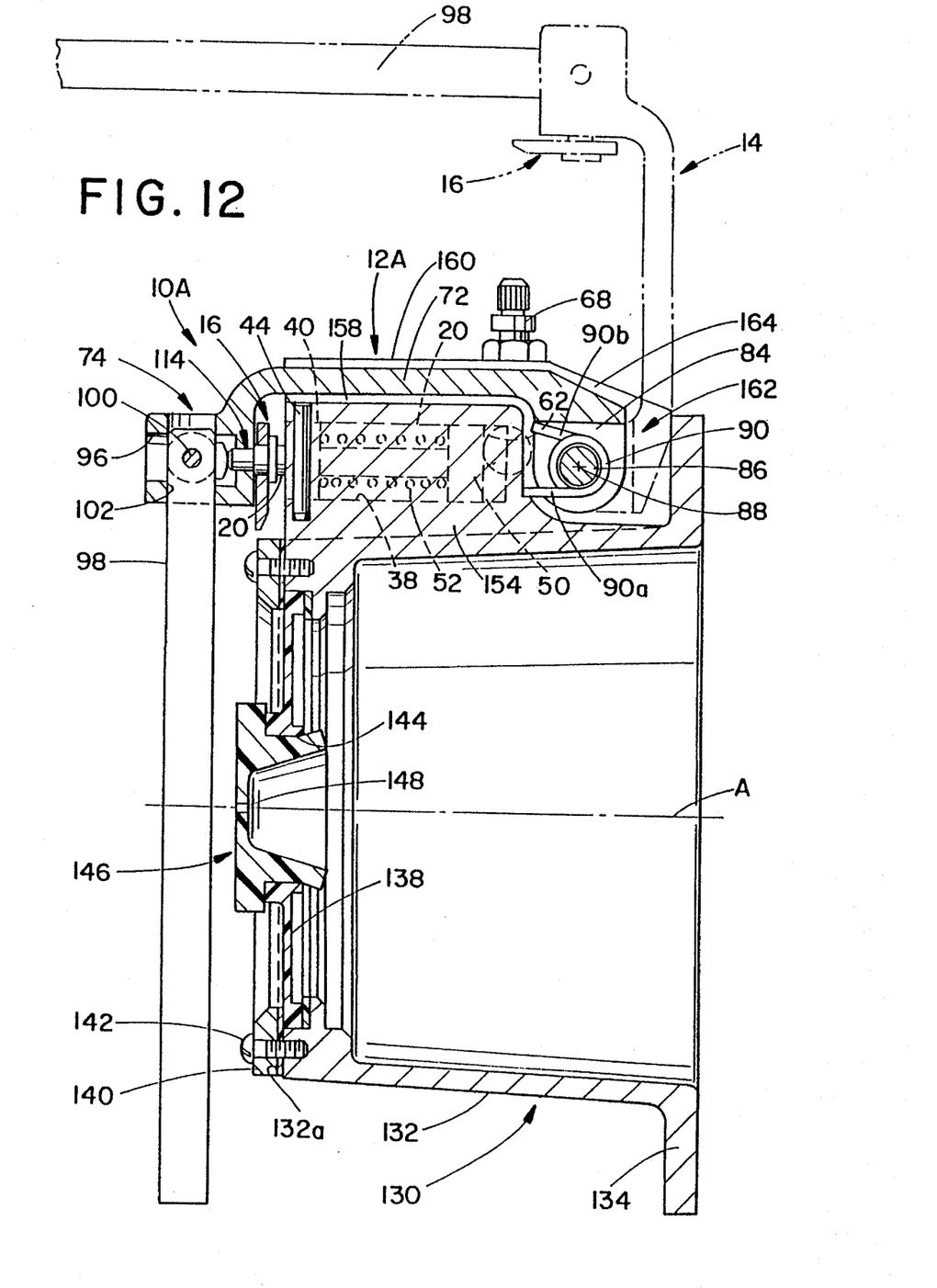
FIG. 12 is a sectional elevation view of the warning device taken along line 12—12 in FIG. 10.

While warning device 10 is illustrated in FIG. 1 as being mounted on the axially outer end of hub H such that first indicator 14 and indicator rod 98 thereof both extend axially outwardly from the hub when the device is actuated, opening 102 provided in extension 94 on lower end 74 of first indicator 14 advantageously enables the warning device to be mounted on the radially outer side of a vehicle hub component should circumstances require such a mounting. FIGS. 10–12 of the drawing illustrate such an embodiment of the present invention and, furthermore, illustrate the housing of the warning device as an integral part of the hub component which is attached to the axially outer end of a wheel assembly for rotation therewith. With the exception of the integral relationship between the housing and hub component, the component parts of the warning device in FIGS. 10–12 correspond to those illustrated and described hereinabove in conjunction with FIGS. 1–9, whereby like numerals appear in FIGS. 10–12 with respect to such component parts. Referring now to the latter Figures, it is common to provide the axially outer end of a dual wheel assembly with an axle oil seal cap 130 which provides a reservoir for lubricating oil for the outer wheel bearings of the dual wheel assembly. Such an oil cap includes an axially extending annular wall 132 provided at its axially inner end with a radially outwardly extending circumferential flange 134 provided with openings 136 which are spaced apart about the periphery thereof and by which the cap is attached to the outer end of the dual wheel assembly hub such as by bolts, not shown, whereby the cap is rotatable with the wheel assembly about wheel axis A. The axially outer end of cap 130 is provided with a window 138 of suitable plastic material which is secured in place across the axially outer end of wall 132 by an annular retaining ring 140 secured to the outer end of wall 132 by threaded fasteners 142. Window 138 is provided centrally with an opening 144 through which oil can be introduced to the interior of the cap, and opening 144 is normally closed by a removable plug 146 of suitable elastomeric material having a vent opening 148 for communicating the interior of cap 130 with atmosphere. As seen in FIG. 11, window 138 is provided with oil level indicia 150, whereby the vehicle operator can readily determine the oil level visually, and wall 132 of the cap is provided with a normally closed oil drain fitting 152.

As will be appreciated from the embodiment illustrated in FIGS. 1–9, it would be difficult, if not impossible, to mount warning device 10 on the axially outer end of cap 130 and, in any event, housing 12 of the latter warning device would overlie and undesirably obstruct viewing the oil level indicia on window 138. In accordance with the embodiment of the invention illustrated in FIGS. 10–12, this disadvantage is overcome by providing for the housing for the warning device, designated generally by the numeral 12A, to be on the radially outer side of cap wall 132, and by providing for indicator rod 98 to be mounted in opening 102 at end 74 of first indicator 14 so as to extend downwardly across window 138 when first indicator 14 is in its stored position. Thus, only the thin rod 98 which may, for example, be 0.375 inch in diameter, extends across window 138, whereby the oil level indicia is not obscured. Further in accordance with this embodiment of the invention, housing 12A of the warning device is cast integrally with wall 132 to extend radially outwardly therefrom and axially between flange 134 and the axially outer end 132a of wall 132. Housing 12A includes an axially extending body portion 154 provided at its radially outer end with an axially extending recess 156 defined by a bottom wall 158 and circumferentially spaced apart walls 160 extending radially outwardly from bottom wall 158. The axially inner end of housing 12A includes a recess 162 axially inwardly adjacent body portion 154 and which receives fingers 184 of first indicator 14 of the warning device. Recess 162 is defined in part by circumferentially spaced apart wall portions 164 of housing 12A, and first indicator 14 is pivotally interconnected with housing 12A by pivot pin 86 which extends through openings therefor in fingers 84 of the first indicator and walls 164 of housing 12A. In the stored position of first indicator, arm 72 thereof advantageously is received in recess 156, thus to minimize the radial dimension of the housing and first indicator and to protect the first indicator. Torsion spring 90 surrounds pivot pin 86 and has its opposite ends interengaging with first indicator 14 and housing 12A so as to bias first indicator 14 from the stored to the actuated position thereof. As will be appreciated in this respect from FIG. 12, first indicator 14 when released from its stored position shown by solid lines is displaced clockwise about axis 88 of pin 86 by spring 90 to its actuated position shown by broken lines. Housing 12A further includes projections 166 and 168 extending circumferentially outward from the corresponding side of body portion 154 and the corresponding pair of walls 160 and 164. In this embodiment, fittings 58 and 66 for lines 22 and 26 which are respectively connected to tires T1 and T2 are connected to the circumferentially outer ends of projections 166 and 168, respectively, and fittings 60 and 68 for respectively inflating and deflating tires T1 and T2 are connected to the radially outer ends of projections 166 and 168, respectively.

As will be appreciated from the description of the embodiment illustrated in FIGS. 1–9, and the illustration in FIG. 12 with respect to chamber 38, piston 50, keeper rod 20, spring 52 and second actuator 16, housing 12A is provided with first and second chambers extending parallel to wheel axis A for reciprocably supporting corresponding piston members, keeper rods and biasing springs. It will likewise be appreciated that these components are cooperable in the same manner described hereinabove with regard to the earlier embodiment to latch first indicator in its stored position, to release the first indicator for displacement to its actuated position in response to an unacceptably low pressure in either one of the tires T1 and T2, and to cause displacement of second indicator 16 to the one of its two unlatched positions which indicates the one of the two tires having the unacceptably low pressure condition.

While considerable emphasis has been placed herein on the structures of and the structural interrelationships between the component parts of preferred embodiments of a warning device in accordance with the present invention, it will be appreciated that many embodiments of the invention can be made and that many changes can be made in the preferred embodiment without departing from the principles of the invention. In this respect, for example, it will be appreciated that the warning device can be readily modified to indicate an unacceptable high pressure in the vehicle tires as opposed to an unacceptable low pressure illustrated and described herein. In this respect, pistons 48 and 50 can be provided on keeper rods 18 and 20 adjacent the lower ends of chambers 36 and 38, the air under pressure in tires T1 and T2 respectively connected to the lower ends of chambers 36 and 38 beneath the corresponding piston, and springs 52 relocated to be between the upper ends of chambers 36 and 38 and the upper side of the corresponding one of the pistons 48 and 50. The pistons and thus the corresponding one of the keeper rods 18 and 20 would be biased upwardly in the chambers in response to air pressure in the corresponding tire and against the bias of the corresponding spring 52, the force of which would be selected in accordance with a predetermined maximum tire pressure. Therefore, if the air pressure in either one of the tires T1 and T2 were to exceed the maximum preselected pressure, the corresponding keeper rod would be displaced upwardly relative to housing 12 to disengage second indicator 16 thus to release first indicator 14 and shift second indicator 16 to one of its indicating positions as described hereinabove. Furthermore, while warning device 10 is illustrated in FIG. 1 as being mounted directly to the axially outer end of hub H through the use of bolts 13, such mounting as well as a radial mounting as described above using warning device 10 can be achieved through the use of an appropriate mounting bracket which is attached to the hub component and to which the warning device is mounted such as by nut and bolt assemblies. Still further, it will be appreciated that the housing of the warning device in the mounting orientation shown in FIG. 1 can be formed integrally with the hub component in the manner disclosed in FIGS. 9–12.

As yet another modification, second indicator 16 can be mounted on first indicator 14 for lateral displacement linearly thereof to achieve the same latching and indicating functions as illustrated and described hereinabove with regard to pivotal mounting of the second indicator. In this respect, the second indicator would have a central position laterally of the first indicator and laterally opposite inclined camming edges engaging with the keeper rods to latch the first indicator in its stored position. Upon displacement of either one of the keeper rods in response to a low or high air pressure condition in the corresponding one of the tires, displacement of the first indicator to its actuated position by torsion spring 90 would cause the other keeper pin and the corresponding end edge of the second indicator to interengage to slide the second indicator laterally of the first indicator from its central position to a lateral position, thus to indicate the one of the tires having the unacceptable pressure condition.

The foregoing and other modifications of the preferred embodiments as well as other embodiments of the invention will be obvious and suggested to those skilled in the art from the disclosure herein, whereby it is to be distinctly understood that the foregoing descriptive matter is to be interpreted merely as illustrative of the present invention and not as a limitation.

Having thus defined the invention it is claimed:

1. A tire air pressure warning device for first and second tires coaxially mounted on common hub means of a vehicle comprising, a housing for mounting on said hub means, first and second pressure sensing means in said housing respectively connected in flow communication with air under pressure in said first and second tires, first indicator means supported on said housing for displacement relative thereto between a stored position and an actuated position, said first indicator means in said actuated position indicating an unacceptable pressure in one of said first and second tires, means for displacing said first indicator means from said stored to said actuated position, said means for displacing being responsive to said first sensing means sensing an unacceptable pressure in said first tire as measured independently of the pressure in said second tire, said means for displacing also being responsive to said second sensing means sensing an unacceptable pressure in said second tire as measured independently of the pressure in said first tire, and second indicator means actuated in response to displacement of said first indicator means to said actuated position thereof for indicating the one of said first and second tires having an unacceptable pressure.

2. A warning device according to claim 1, wherein said second indicator means is mounted on said first indicator means for movement therewith from said stored to said actuated position.

3. A warning device according to claim 1, wherein said first indicator means is mounted on said housing for pivotal displacement relative thereto between said stored and actuated positions.

4. A warning device according to claim 3, wherein said means for displacing said first indicator means from said stored position to said actuated position includes biasing spring means.

5. A warning device according to claim 1, wherein each said first and second pressure sensing means includes a chamber in said housing having axially opposite ends, means connecting one of said opposite ends with air under pressure in the corresponding one of said first and second tires, piston means axially slidably supported in said chamber for displacement by said air under pressure in the direction from said one end of said chamber towards the other end, and means biasing said piston means in the direction toward said one end.

6. A warning device according to claim 1, wherein said second indicator means has a first position and a second position respectively indicating said first tire and said second tire to have an unacceptable pressure.

7. A warning device according to claim 6, wherein said first and second pressure sensing means includes means for displacing said second indicator means to one of said first and second positions thereof in response to displacement of said first indicator means from said stored to said actuated position.

8. A warning device according to claim 7, wherein said second indicator means is mounted on said first indicator means for movement therewith from said stored to said actuated position.

9. A warning device according to claim 6, wherein said second indicator means is mounted on said first indicator means for displacement therewith from said stored position to said actuated position and for displacement relative thereto between said first and second positions, said second indicator means having a third position between said first and second positions thereof when said first indicator means is in said stored position, and said first and second pressure sensing means including means to displace said second indicator means from said third position to one of said first and second positions in response to displacement of said first indicator means from said stored to said actuated position.

10. A warning device according to claim 9, wherein said first indicator means is mounted on said housing for pivotal displacement relative thereto between said stored and actuated positions about a first axis, and said second indicator means is mounted on said first indicator means for pivotal displacement relative thereto between said first and second positions about a second axis transverse to said first axis.

11. A warning device according to claim 10, wherein said means for displacing said first indicator means from said stored position to said actuated position includes biasing spring means.

12. A warning device according to claim 11, wherein said means to displace said second indicator means includes means engaging said second indicator means in said third position thereof to retain said first indicator means in said stored position against the bias of said spring means.

13. A warning device according to claim 1, wherein said first and second pressure sensing means and said second indicator means include interengaging means for releasably holding said first indicator means in said stored position.

14. A warning device according to claim 13, wherein said second indicator means has first and second positions respectively indicating said first and second tires to have an unacceptable pressure, said interengaging means including means for displacing said second indicator means to one of said first and second positions thereof in response to displacement of said first indicator means from said stored to said actuated position.

15. A warning device according to claim 14, wherein said first and second pressure sensing means respectively include first and second keeper means displacable between engaged and disengaged positions relative to said second indicator means, said first indicator means being held in said stored position when both said keeper means are in said engaged position, and said first indicator means being released for displacement from said stored to said actuated position thereof when one of said first and second keeper means is in said engaged position thereof and the other keeper means is in the released position thereof.

16. A warning device according to claim 15, wherein said one of said keeper means and said second indicator means interengage to displace said second indicator means to one of said first and second positions thereof when said other keeper means is in the released position thereof.

17. A warning device according to claim 16, wherein said second indicator means is mounted on said first indicator means for displacement therewith from said stored to said actuated position.

18. A warning device according to claim 17, wherein said second indicator means is mounted on said first indicator means for pivotal displacement in opposite directions about a pivot axis, said first and second keeper means in said engaged positions thereof engaging said second indicator means on laterally opposite sides of said pivot axis to preclude pivotal displacement thereof and hold said first indicator means in said stored position, said other of said keeper means in said released position thereof disengaging said second indicator means, whereby said first indicator means is released for displacement to said actuated position and said one keeper means engages said second indicator means to pivot said second indicator means to said one of said first and second positions thereof in response to displacement of said first indicator means to said actuated position.

19. A warning device according to claim 18, wherein said pivot axis is a first pivot axis and said first indicator means is mounted on said housing for pivotal displacement relative thereto between said stored and actuated positions about a second pivot axis perpendicular to said first pivot axis.

20. A warning device according to claim 19, wherein said means for displacing said first indicator means from said stored position to said actuated position includes biasing spring means.

21. A tire air pressure warning device for first and second tires coaxially mounted on common hub means of a vehicle, comprising a housing for mounting on said hub means, first and second pressure responsive keeper means in said housing, means respectively connecting said first and second keeper means in flow communication with air under pressure in said first and second tires, each said keeper means having a first keeper position when the air pressure in the corresponding tire is a first pressure and a second keeper position when the air pressure in said corresponding tire is a second pressure different from said first pressure, a first indicator mounted on said housing for displacement relative thereto between a stored position and an actuated position, a second indicator mounted on said first indicator for displacement therewith and for displacement relative thereto between a latched position and first and second unlatched positions, said first and second unlatched positions respectively indicating said first and said second tire to have said second pressure, said second indicator in said latched position interengaging with said first and second keeper means in said first keeper positions thereof to releasably hold said first indicator in said stored position, either one of said first and second keeper means in said second keeper position thereof disengaging said second indicator, whereby said first indicator is released for displacement from said stored position to said actuated position and said second indicator is displaced to one of said first and second unlatched positions by engagement thereof with the other of said first and second keeper means in response to displacement of said first indicator from said stored position toward said actuated position.

22. A warning device according to claim 21, wherein said second indicator is mounted on said first indicator for pivotal displacement about a pivot axis, said first and second keeper means in said first positions thereof engaging said second indicator in said latched position thereof on laterally opposite sides of said pivot axis.

23. A warning device according to claim 22, wherein said pivot axis is a first pivot axis, said first indicator being mounted on said housing for pivotal displacement between said stored and actuated positions about a second pivot axis perpendicular to said first pivot axis, and spring means biasing said first indicator to pivot about said second axis in the direction from said stored to said actuated position.

24. A warning device according to claim 23, wherein said means respectively connecting said first and second keeper means with air under pressure in said first and second tires includes first and second cylindrical chambers in said housing each having an axis and axially opposite ends, said first and second keeper means respectively including first and second pistons axially slidably supported in said first and second chambers between said opposite ends thereof, means respectively connecting said first and second chambers with air under pressure in said first and second tires for biasing the corresponding piston in the direction toward said first positions of said keeper means, and first and second springs in said chambers for respectively biasing said first and second pistons in the direction toward said second positions of said keeper means.

25. A warning device according to claim 24, wherein said first and second keeper means further includes first and second rod members respectively axially displacable by said first and second pistons between said first and second positions of said keeper means, said rod members having ends axially spaced from said pistons, said rod ends in said first positions of said keeper means interengaging with said second indicator in said latched position thereof.

26. A warning device according to claim 25, wherein said first and second springs respectively surround said first and second rod members between said first and second pistons and one of said opposite ends of said chambers.

27. A warning device according to claim 22, wherein each of said first and second keeper means includes a rod member having an axis parallel to said pivot axis, and means for reciprocating said rod member axially between said first and second keeper positions thereof.

28. A warning device according to claim 27, wherein said pivot axis is a first pivot axis, said first indicator being mounted on said housing for pivotal displacement between said stored and actuated positions about a second pivot axis perpendicular to said first pivot axis, and spring means biasing said first indicator to pivot about said second axis in the direction from said stored to said actuated position.

29. A warning device according to claim 21, wherein said means respectively connecting said first and second keeper means with air under pressure in said first and second tires includes first and second cylindrical chambers in said housing each having an axis and axially opposite ends, said first and second keeper means including first and second pistons respectively axially slidably supported in said first and second chambers between said opposite ends thereof, means respectively connecting said first and second chambers with air under pressure in said first and second tires for biasing the corresponding piston in the direction toward said first positions of said keeper means, and first and second springs in said chambers for respectively biasing said first and second pistons in the direction toward said second position of said keeper means.

30. A warning device according to claim 29, wherein said first and second keeper means respectively include first and second rod members coaxial with and axially displacable by said first and second pistons of said keeper means, said rod members having ends axially spaced from said pistons, said rod ends in said first positions of said keeper means interengaging with said second indicator in said latched position thereof.

31. A warning device according to claim 30, wherein said first and second springs respectively surround said first and second rod members between said first and second pistons and one of said opposite ends of said chambers.

32. A warning device according to claim 30, wherein said housing has axially opposite ends with respect to the axes of said chambers, said first indicator having a first end pivotally connected to said housing at one of said opposite ends thereof and a second end spaced from said first end, said second end of said first indicator being adjacent the other of said opposite ends of said housing when said first indicator is in said stored position, and said second indicator being mounted on said second end of said first indicator.

33. A warning device according to claim 32, wherein said first indicator is pivotal relative to said housing about a pivot axis at said first end perpendicular to said axes of said chambers, and spring means biasing said first indicator to pivot relative to said housing from said stored to said actuated position.

34. A warning device according to claim 33, wherein said second indicator has first and second edge means respectively interengaging with said ends of said first and second rod members in said first positions of said keeper means and said latched position of said second indicator.

35. A warning device according to claim 34, wherein said pivot axis is a first pivot axis and said second indicator is mounted on said second end of said first indicator for pivotal displacement relative thereto about a second pivot axis perpendicular to said first pivot axis, and said first and second edge means being on laterally opposite sides of said second pivot axis.

36. A warning device according to claim 35, wherein said second indicator in said stored position of said first indicator is axially outwardly adjacent said other end of said housing and said ends of said first and second rod members in said first positions of said keeper means extend axially outwardly of said other end of said housing to respectively engage said first and second edge means of said second indicator.

37. A warning device according to claim 36, wherein each said first and second chamber has a first end adjacent said one end of said housing and a second end adjacent said other end of said housing, said means respectively connecting said first and second chambers with air under pressure in said first and second tires including first and second air inlet ports in said one end of said housing respectively opening into said first and second chambers at said first ends thereof, and said first and second springs respectively surrounding said first and second rod members between said first and second pistons and said second ends of said chambers.

38. A warning device according to claim 21, wherein said housing has opposite ends, said first indicator having a first end pivotally connected to said housing at one of said opposite ends thereof and a second end spaced from said first end, said second end of said first indicator being adjacent the other of said opposite ends of said housing when said first indicator is in said stored position, and said second indicator being mounted on said second end of said first indicator.

39. A warning device according to claim 38, wherein said first indicator is pivotal relative to said housing about a pivot axis at said first end of said first indicator, said device further comprising spring means biasing said first indicator to pivot relative to said housing from said stored to said actuated position.

40. A warning device according to claim 39, wherein said second indicator has first and second edge means respectively interengaging with said first and second keeper means in said first positions of said keeper means and said latched position of said second indicator.

41. A warning device according to claim 40, wherein said pivot axis is a first pivot axis and said second indicator is mounted on said second end of said first indicator for pivotal displacement relative thereto about a second pivot axis perpendicular to said first pivot axis, and said first and second edge means being on laterally opposite sides of said second pivot axis.

42. A warning device according to claim 41, wherein said second indicator in said stored position of said first indicator is axially outwardly adjacent said other end of said housing and said first and second keeper means in said first positions of said keeper means extend axially outwardly of said other end of said housing to respectively engage said first and second edge means of said second indicator.

43. A warning device according to claim 42, wherein said means respectively connecting said first and second keeper means with air under pressure in said first and second tires includes first and second cylindrical chambers in said housing each having an axis extending in the direction between said opposite ends of said housing, each of said chambers having axially opposite ends, said first and second keeper means including first and second pistons respectively axially slidably supported in said first and second chambers between said opposite ends thereof, means respectively connecting said first and second chambers with air under pressure in said first and second tires for biasing the corresponding piston in the direction toward said other end of said housing and to said first positions of said keeper means, and first and second springs in said chambers for respectively biasing said first and second pistons in the direction toward said one end of said housing and to said second positions of said keeper means.

44. A warning device according to claim 43, wherein said first and second keeper means respectively include first and second rod members axially displacable by said first and second pistons between said first and second positions of said keeper means, said rod members having ends axially spaced from said pistons, said ends of said rod members in said first positions of said keeper means extending outwardly from said other end of said housing for interengaging with said first and second edge means of said second indicator in said latched position thereof.

45. A warning device according to claim 44, wherein said first and second springs respectively surround said first and second rod members between said first and second pistons and one of said opposite ends of said chambers.

46. A tire air pressure warning device for first and second tires coaxially mounted on common hub means of a vehicle, comprising a housing for mounting on said hub means, a first indicator mounted on said housing for displacement relative thereto between a stored position and an actuated position, means for displacing said first indicator from said stored position to said actuated position said means for displacing being responsive to an unacceptable pressure in said first tire as measured independently of the pressure in said second tire, said means for displacing also being responsive to an unacceptable pressure in said second tire as measured independently of the pressure in said first tire, and second indicator means actuated in response to displacement of said first indicator to said actuated position for indicating the one of said first and second tires having said unacceptable pressure.

* * * * *